United States Patent [19]

Barthruff et al.

[11] 4,387,315

[45] Jun. 7, 1983

[54] STARTER MOTOR FOR INTERNAL COMBUSTION ENGINES

[75] Inventors: Otto Barthruff, Stuttgart; Martin Mayer, Sersheim, both of Fed. Rep. of Germany

[73] Assignee: Robert Bosch GmbH, Stuttgart, Fed. Rep. of Germany

[21] Appl. No.: 281,237

[22] Filed: Jul. 7, 1981

[30] Foreign Application Priority Data

Jul. 30, 1980 [DE] Fed. Rep. of Germany ....... 3028807

[51] Int. Cl.³ .............................................. H02K 5/00
[52] U.S. Cl. ..................................................... 310/90
[58] Field of Search ................ 290/38 A, 48; 310/90; 411/517, 519; 308/135, 163–166, DIG. 11

[56] References Cited

U.S. PATENT DOCUMENTS

| 2,900,525 | 8/1959 | Spencer | 290/38 A |
| 2,934,656 | 4/1960 | Seilly | 290/38 A |
| 3,298,756 | 1/1967 | Wilson | 308/135 |
| 3,663,849 | 5/1972 | Heob | 310/90 |
| 3,726,575 | 4/1973 | Moorman | 310/90 X |

FOREIGN PATENT DOCUMENTS 937479 9/1963 United Kingdom ................ 308/135

Primary Examiner—John Gonzales
Attorney, Agent, or Firm—Frishauf, Holtz, Goodman & Woodward

[57] ABSTRACT

To provide for axial alignment of the shaft of a starter motor, the shaft is formed with a ring groove (17) and a pair of half-disks (18) positioned between a holding plate (12) of the brush holder and the end shield (6) of the starter retains the half-disks in position, the half-disks engaging in the groove to thus position the axial location of the starter shaft (3).

8 Claims, 4 Drawing Figures

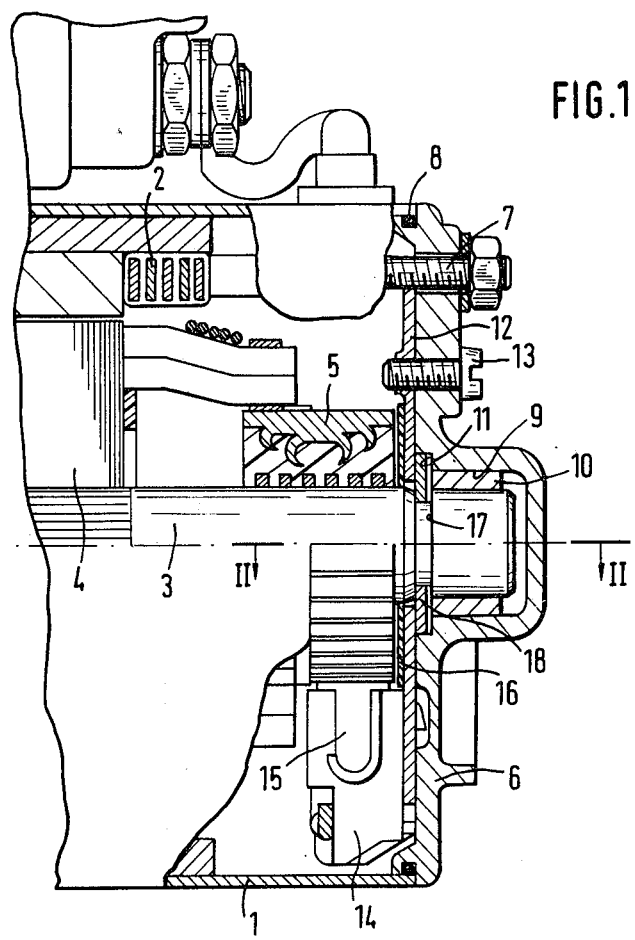
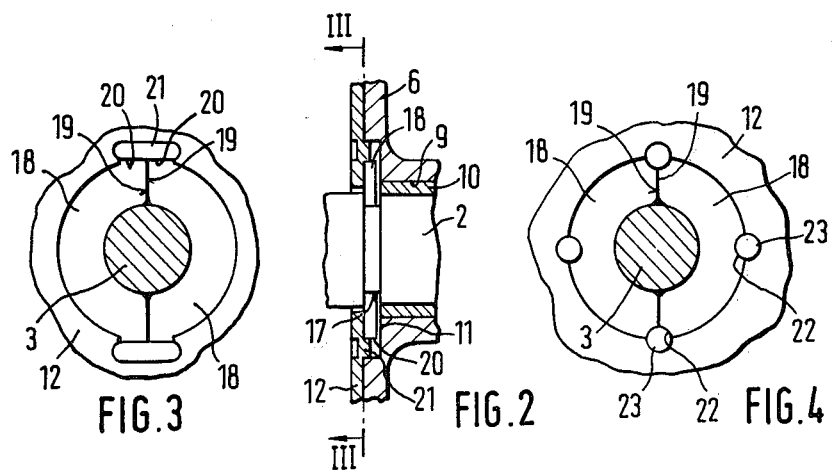

STARTER MOTOR FOR INTERNAL COMBUSTION ENGINES

The present invention relates to a starter motor for internal combustion engines, and more particularly to a motor construction in which the drive shaft of the starter motor is maintained in accurately positioned axial location.

BACKGROUND

The axial play or movement permitted to the drive shaft of a starter motor must be accurately controlled. It has previously been proposed to control the axial play or movement of the drive shaft of a starter motor by placing a U-shaped disk on the shaft between the commutator and the bearing adjacent thereto, and then controlling the axial play by fitting shins between the U-shaped disk and the bearing. The starter motor, upon having started the engine and being placed in over-running condition, should be stopped as quickly as possible by braking. In order to brake the overrun, or run-out of the starter motor after having started the engine, the facing side of the commutator rubs against the inner facing of the side of the commutator bearing, requiring a certain longitudinal or axial movement of the drive shaft. Due to wear of the facing side of the commutator, the axial movement of the drive shaft becomes larger. If the run-out or over-run brake is located at different positions in the starter, it is still necessary to control the axial movement of the shaft of the starter by measuring the fitting appropriate shims or disks between the bearing adjacent the commutator and a U-shaped disk fitted into a ring groove of the starter. Manufacture of the starter thus requires individual matching, and thus is costly from labor and assembly point of view, and difficult to accurately control in manufacture. The end of the starter shaft which extends from the bearing adjacent the commutator has to be additionally closed off with a cap and a sealing ring which, further, increases assembly costs and additionally contributes to increasing the axial length of the starter, thus making eventual fitting of the starter into an automotive vehicle more difficult.

THE INVENTION

It is an object to provide for accurate positioning of the drive shaft of a starter motor so that the axial play of the drive shaft can be accurately controlled without requiring individual shims or the like.

Briefly, the drive shaft cooperates with an axial play limiting system which is positioned between the bearing adjacent the commutator and one of the commutator brush holders, and which is arranged to be secure against rotation, being held in position by a portion of the brush holder, for example, or an element attached thereto.

In accordance with a feature of the invention, two half-ring disk-shaped units are provided fitted in a recess in an end shield of the starter motor and fitted against the end shield, extending into a ring groove cut in the drive shaft, and which have engagement surfaces which are so shaped that the half-disks are secure in position and non-rotatably retained in the end shield, for example by being formed with interengaging notch-and-projection means with respect to the end shield. The disk-shaped units have thicknesses just slightly less than the width of the recess 11 in the end shield, and of the ring groove 17, respectively, to thereby determine the permissible axial play, or excursion of the shaft.

The arrangement has the advantage that the axial play of the shaft of the starter motor is accurately controlled by locating the positioning element between the bearing of the starter motor and the adjacent brush holder, since no subsequent matching or fitting shims corresponding to tolerances of the components are required. Further, since the axial position of the shaft with respect to the bearing is determined to be closely adjacent the bearing, different thermal expansion of respective components need not be compensated. The bearing of the starter adjacent the commutator can be constructed as a single unit, thus decreasing the axial length of the starter motor and, simultaneously, eliminating problems with sealing the bearing adjacent the commutator with respect to escape of lubricant therefrom.

In accordance with a particularly advantageous construction, which is a preferred form, the axial play control device uses two half-disks which are so shaped that they can be securely placed against the end shield of the starter, and will not rotate with respect thereto in use.

DRAWINGS

FIG. 1 is a fragmentary end view, partly in axial section, of a starter, and illustrating the portion of the starter adjacent the commutator thereof;

FIG. 2 is a fractional section along line II—II of FIG. 1;

FIG. 3 is a section along line III—III of FIG. 2; and

FIG. 4 is a view similar to FIG. 3, but showing an alternate embodiment.

The starter motor has a housing 1 retaining a field winding 2. An armature 4 is positioned on a shaft 3, the shaft 3 also retaining a commutator 5 secured thereto. The housing 1 is closed off by an end shield 6, retained against the housing by bolts 7 which can extend through the housing to an opposite end shield. This portion of the construction of the starter is standard and can be in accordance with any suitable and well known design. A sealing ring 8 seals the end shield 6 to the housing shell 1.

A slide or journal bearing 10 is located in a recessed portion 9 formed in the end shield 6. The end of the drive shaft 3 is journaled in the bearing 10. The blind hole or bore or recess 9 has an enlarged inner portion 11. The base plate 12 of a brush holder, which can be of any suitable construction, is secured against the end shield 6 by screws 13. The base plate 12 also retains the brush guide tubes 14 on which brushes 15, sliding on the commutator 5, are located. An insulating disk 16 is loosely placed on the drive shaft 3 between the side of the commutator 5 facing the plate 12 and the plate 12 itself. The base plate 12 may be formed with a recess facing the recess 11 in the housing (see FIG. 2).

In accordance with a feature of the invention, a groove 17 extending circumferentially around the shaft is cut therein. The groove is positioned between the portion of the shaft holding the commutator 5 and the portion extending into the bearing 10. Two half-ring disks 18 are fitted to engage into the groove 17. The half-disks 18 are held securely in the enlarged portion 11 of the end shield 6. The thickness of the disks 18 is slightly less than the width of the groove 17 and of the enlarged inner portion 11, see FIGS. 1 and 2, to thus predetermine the axial play of the shaft 17 with respect to the end shield 6.

As best seen in FIG. 3, the two half disks 18 are formed with engagement surfaces 20 at the circumference thereof, adjacent the fitting division lines 19 thereof. Projections 21 are formed in the base plate 12 of the brush holders which fit into the enlarged end portion 11 of the end shield 6 and which engage against the surfaces 20 of the half-ring disks 18. Thus, the disk 18 are reliably retained between the end shield 6 and the base plate 12 of the brush holder and also secured against rotation; the drive shaft 3 can rotate freely, but the axial position of the shaft is securely determined by the disks 18. The position of the shaft 3 is thus determined by the constructional element, and thus an exact axial play of the shaft 3 can be obtained. No additional adjustment by using additional shims or matching disks is needed. The additional end cap for the end of the drive shaft 3 fitting over the bearing in the end shield 3 is no longer needed, so that the bearing is completely sealed against contamination.

FIG. 4 illustrates another embodiment of the disks 18' which have circumferential recesses 22 formed therein, engaged by locating bumps or projections 23 formed in the base plate 12 of the brush holder, in order to retain the half-ring disks 18' securely in the end portion 11 of the commutator end shield.

We claim:

1. Starter motor for an internal combustion engine comprising
    a housing (1) including an end shield (6);
    a rotor including a shaft (3) and an armature (4);
    a commutator (5) secured to the shaft and located thereon adjacent the end shield (6);
    a bearing (10) located in the end shield and rotatably receiving the shaft (3);
    a brush holder assembly (12) secured to the housing adjacent the end shield;
    and means axially positioning the shaft of the rotor with respect to the end shield (6) subject to permitted axial play or excursion including
    radially inwardly projecting means (18, 19, 20, 21, 22, 23) positioned between the brush holder assembly (12) and the end shield (6) and non-rotatably held in the housing;
    a recess (11) formed at least in part in the housing, said recess being slightly wider than the thickness of the projecting means and receiving said projecting means, and determining a portion of the permitted axial play;
    and a receiving groove (17) formed in the shaft, in axial alignment with said projecting means and slightly wider than the thickness of the projecting means and receiving said projecting means, and determining the remaining portion of permitted axial play.

2. Motor according to claim 1, wherein the recess (11) is formed entirely in the end shield.

3. Motor according to claim 1, wherein the recess is formed in part in the end shield (6) and in part in the brush holder assembly (12).

4. Starter motor for an internal combustion engine comprising
    a housing (1) including an end shield (6);
    a rotor including a shaft (3) and an armature (4);
    a commutator (5) secured to the shaft and located thereon adjacent the end shield (6);
    a bearing (10) located in the end shield and rotatably receiving the shaft (3);
    a brush holder assembly (12) secured to the housing adjacent the end shield;
    and means axially positioning the shaft of the rotor with respect to the end shield (6) subject to permitted axial play or excursion including
    radially inwardly projecting means (18, 19, 20, 21, 22, 23) positioned between the brush holder assembly (12) and the end shield (6) and non-rotatably held in the housing;
    a recess (11) formed at least in part in the housing, said recess being slightly wider than the thickness of the projecting means and receiving said projecting means, and determining a portion of the permitted axial play;
    and a receiving groove (17) formed in the shaft, in axial alignment with said projecting means and slightly wider than the thickness of the projecting means and receiving said projecting means, and determining the remaining portion of permitted axial play,
    and wherein the radially inwardly projecting means comprise
    two half-disks (18), the end shield (6) being formed with a recess receiving said half-disks, the half-disks each being formed with engagement surfaces (20, 22) and the brush holder assembly (12) being formed with matching engagement surfaces to prevent relative rotation of the half-disks with respect to the brush holder assembly.

5. Starter motor according to claim 4, wherein the engagement surfaces on the half-disks are flattened circumferential surface portions.

6. Starter motor according to claim 4, wherein the engagement surfaces on the half-disks comprise round holes formed therein, and the brush holder assembly includes projecting bumps located in matching alignment with said holes.

7. Motor according to claim 4, wherein the recess (11) is formed entirely in the end shield.

8. Motor according to claim 4, wherein the recess is formed in part in the end shield (6) and in part in the brush holder assembly (12).

* * * * *